United States Patent
Hemaraj et al.

(10) Patent No.: US 9,996,254 B2
(45) Date of Patent: Jun. 12, 2018

(54) HIDDEN APPLICATION ICONS

(71) Applicant: Samsung Electronics Co., Ltd., Suwon-si, Gyeonggi-do (KR)

(72) Inventors: Kiran Bindhu Hemaraj, Thiruvananthapuram (IN); Vijith Menon, Kozhikode District (IN); Nithin John, Cochin (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 143 days.

(21) Appl. No.: 14/863,053

(22) Filed: Sep. 23, 2015

(65) Prior Publication Data

US 2017/0083711 A1    Mar. 23, 2017

(51) Int. Cl.

| | |
|---|---|
| *G06F 3/0488* | (2013.01) |
| *G06F 3/0481* | (2013.01) |
| *G06F 3/16* | (2006.01) |
| *G06F 3/0482* | (2013.01) |
| *G06F 3/0484* | (2013.01) |
| *G06F 21/60* | (2013.01) |

(Continued)

(52) U.S. Cl.
CPC ........ *G06F 3/04883* (2013.01); *G06F 3/0482* (2013.01); *G06F 3/0484* (2013.01); *G06F 3/04817* (2013.01); *G06F 3/167* (2013.01); *G06F 21/604* (2013.01); *G06F 21/629* (2013.01); *G06K 9/00013* (2013.01)

(58) Field of Classification Search
None
See application file for complete search history.

(56) References Cited

U.S. PATENT DOCUMENTS 5,592,605 A * 1/1997 Asuma ............... G06F 3/0483
715/775
7,864,163 B2 * 1/2011 Ording ............... G06F 3/0488
345/173

(Continued)

FOREIGN PATENT DOCUMENTS

KR    20140012828 A    2/2014

OTHER PUBLICATIONS

PCT International Search Report and Written Opinion for PCT Application No. PCT/IB2016/055707, dated Dec. 13, 2016, 14 pages.

*Primary Examiner* — Farid Homayounmehr
*Assistant Examiner* — Olanrewaju J. Bucknor
(74) *Attorney, Agent, or Firm* — Jefferson IP Law, LLP (57) ABSTRACT

A user device may include a touchscreen, a storage device, and a processing device. The storage device stores native applications and their corresponding icon data. The icon data includes an icon, a location of the icon on a launch screen, a flag indicating whether the icon is hidden or visible, and an unlocking instruction. The processing device may display the launch screen via the touchscreen whereby the launch screen displaying one or more icons. The processing device monitors the touchscreen and receives user input at an unpopulated screen location occupied by a hidden icon. The processing devices receives a user instruction at the unpopulated screen location, verifies the user instruction with the unlocking instruction associated with the icon. When the user instruction is verified, the processing device can display the hidden icon or may launch the native application corresponding to the hidden icon.

19 Claims, 6 Drawing Sheets

(51) Int. Cl.
*G06F 21/62* (2013.01)
*G06K 9/00* (2006.01)

(56) References Cited

U.S. PATENT DOCUMENTS

| | | |
|---|---|---|
| 8,948,820 B2 | 2/2015 | Tsunoda |
| 9,165,128 B1 | 10/2015 | Daniel |
| 2008/0168401 A1* | 7/2008 | Boule ................ G06F 3/04883 715/863 |
| 2010/0306718 A1 | 12/2010 | Shim et al. |
| 2011/0047461 A1 | 2/2011 | Bargmann |
| 2013/0219340 A1* | 8/2013 | Linge ................ G06F 3/04883 715/834 |
| 2013/0263251 A1* | 10/2013 | Fleizach ............ G06F 3/04883 726/19 |
| 2014/0033131 A1* | 1/2014 | Shaffer .............. G06F 3/04883 715/835 |
| 2014/0033136 A1* | 1/2014 | St. Clair ................ G06F 3/017 715/863 |
| 2014/0165003 A1 | 6/2014 | Branton et al. |
| 2014/0165012 A1* | 6/2014 | Shen ..................... G06F 9/4451 715/863 |
| 2014/0206316 A1 | 7/2014 | Kim |
| 2015/0160788 A1 | 6/2015 | Sun et al. |
| 2016/0014258 A1* | 1/2016 | Hwang ............ H04M 1/72544 455/418 |
| 2016/0041719 A1 | 2/2016 | Wang et al. |
| 2016/0274749 A1 | 9/2016 | Li et al. |

\* cited by examiner

HIDDEN APPLICATION ICONS

TECHNICAL FIELD

This disclosure relates to an application launcher that is configured to hide icons from appearing in a launch screen.

BACKGROUND

User devices can install and execute native software applications. A native application may refer to an edition of a software product that is installed on and executed by the user device. In most circumstances, a user instructs the user device to launch a native application by selecting (e.g., pressing) on an icon corresponding to the native application. An application launcher senses such a selection and instructs the operating system to launch or otherwise access the native application corresponding to the selected icon.

SUMMARY

One aspect of the disclosure provides a user device for identifying expert reviewers. The user device includes a touchscreen and a storage device storing a set of native applications and icon data corresponding to each respective native application. Each native application includes icon data defining an icon, a location of the icon on a launch screen displayed on the touchscreen, a hidden flag indicating whether the icon is visible or hidden, and when the hidden flag indicates the icon is hidden, an unlocking instruction associated with the icon. The user device also includes a processing device that executes computer-readable instructions that, when executed by the processing device, cause the processing device perform operations. The operations include displaying the launch screen via the touchscreen, monitoring the touchscreen for user input and receive user input at an unpopulated screen location of the launch screen. The launch screen displays one or more icons at one or more corresponding locations of the launch screen. The unpopulated screen location is occupied by a hidden icon. The operations further include receiving a user instruction corresponding to the unpopulated screen location and verifying the user instruction with the unlocking instruction associated with the icon. When the user instruction is verified, the user device displays the hidden icon at the unpopulated screen location.

Implementations of the disclosure may include one or more of the following optional features. In some implementations, the user instruction is a gesture performed on the touchscreen at the unpopulated screen location and the unlocking instruction associated with the hidden icon is a previously registered gesture. Receiving the user instruction may include in response to the received user input at the unpopulated screen location, monitoring the unpopulated screen location for additional user input, receiving the gesture at the unpopulated screen location via the touchscreen, and recording the gesture. Verifying the user instruction may include retrieving the icon data corresponding to the hidden icon based on the unpopulated screen location, comparing the recorded gesture with the registered gesture, and verifying the user instruction when the recorded gesture matches the registered gesture.

The user instruction may be a passcode entered by the user and the unlocking instruction associated with the hidden icon may be a previously registered passcode. Receiving the user instruction may further include in response to the received user input at the unpopulated screen location, turning on a microphone of the user device, receiving the passcode from the user in a form of audio input via the microphone, and recording the audio input. Verifying the user instruction may further include retrieving the icon data corresponding to the hidden icon based on the unpopulated screen location, comparing the recorded audio input with the registered passcode, and verifying the user instruction when the recorded audio input matches the registered passcode.

In some examples, receiving the user instruction includes, in response to the received user input at the unpopulated screen location, prompting the user to enter the passcode via the touchscreen, receiving the passcode from the user via the touchscreen, and recording the received passcode. Receiving the user instruction may further include verifying the user instruction including retrieving the icon data corresponding to the hidden icon based on the unpopulated screen location, comparing the recorded received passcode with the registered passcode, and verifying the user instruction when the recorded passcode matches the registered passcode. The user instruction may be biometric data provided by the user and the unlocking instruction associated with the hidden icon may be a previously registered biometric data.

A hidden flag corresponding to a native application may be set by displaying an icon corresponding to the native application at a specific grid location in the launch screen, detecting a recognized action at the specific grid location, prompting the user to register an instruction with respect to the displayed icon, receiving the instruction via the touchscreen, associating the received instruction with the native application, and setting the hidden flag of the native application.

Another aspect of the disclosure provides a second user device for identifying expert reviewers. The user device includes a touchscreen and a storage device storing a set of native applications and icon data corresponding to each respective native application. Each native application includes icon data defining an icon, a location of the icon on a launch screen displayed on the touchscreen, a hidden flag indicating whether the icon is visible or hidden, and when the hidden flag indicates the icon is hidden, an unlocking instruction associated with the icon. The user device further includes a processing device that executes computer-readable instructions that, when executed by the processing device, cause the processing device perform operations. The operations include displaying the launch screen via the touchscreen, the launch screen displaying one or more icons at one or more corresponding locations of the launch screen, monitoring the touchscreen for user input and receiving user input at an unpopulated screen location of the launch screen. The unpopulated screen location is occupied by a hidden icon. The operations further include receiving a user instruction corresponding to the unpopulated screen location, verifying the user instruction with the unlocking instruction associated with the icon, and when the user instruction is verified, launching the native application corresponding to the hidden icon.

Implementations of the disclosure may include one or more of the following optional features. The user instruction may be a gesture performed on the touchscreen at the unpopulated screen location and the unlocking instruction may be associated with the hidden icon is a previously registered gesture. Receiving the user instruction may include, in response to the received user input at the unpopulated screen location, monitoring the unpopulated screen location for additional user input, receiving the gesture at the unpopulated screen location via the touchscreen, and recording the gesture. Verifying the user instruction may further include retrieving the icon data corresponding to the hidden icon based on the unpopulated screen location, comparing the recorded gesture with the registered gesture, and verifying the user instruction when the recorded gesture matches the registered gesture.

The user instruction may be a passcode entered by the user and the unlocking instruction may be associated with the hidden icon is a previously registered passcode. Receiving the user instruction may further includes, in response to the received user input at the unpopulated screen location, turning on a microphone of the user device, receiving the passcode from the user in a form of audio input via the microphone, and recording the audio input. Verifying the user instruction may further include retrieving the icon data corresponding to the hidden icon based on the unpopulated screen location, comparing the recorded audio input with the registered passcode, and verifying the user instruction when the recorded audio input matches the registered passcode.

In some implementations, receiving the user instruction includes, in response to the received user input at the unpopulated screen location, prompting the user to enter the passcode via the touchscreen, receiving the passcode from the user via the touchscreen, and recording the received passcode. Verifying the user instruction may include retrieving the icon data corresponding to the hidden icon based on the unpopulated screen location, comparing the recorded received passcode with the registered passcode, and verifying the user instruction when the recorded passcode matches the registered passcode. The user instruction may be biometric data provided by the user and the unlocking instruction may be associated with the hidden icon is a previously registered biometric data. A hidden flag corresponding to a native application may be set by displaying an icon corresponding to the native application at a specific grid location in the launch screen, detecting a recognized action at the specific grid location, prompting the user to register an instruction with respect to the displayed icon, receiving the instruction via the touchscreen, associating the received instruction with the native application, and setting the hidden flag of the native application.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

User devices execute native applications. The term user device can refer to any suitable consumer grade computing devices. For example, a user device may be a smartphone, a tablet computer, a laptop computer, a smart appliance, or a gaming device. A user device may execute an application launcher. An application launcher is an interface between the user and the operating system. Put another way, the application launcher launches native applications in response to a user selection. The application launcher displays icons. Each icon corresponds to a different native application. A user can select an icon by for example, pressing on the icon. The application launcher may display one or more launch screens. The launch screens may be home screens and/or application menu screens. The application launcher may perform other functions, such as displaying widgets.

One issue that user's find with launch screens is that anyone who uses the user device may know what native applications the user has downloaded to the user device. Users may not wish others to know that they have certain types of native applications on their user devices (e.g., adult content). Additionally or alternatively, a user may wish to keep their children from accessing certain native applications (e.g., violent video games). According to some implementations discussed herein, an application launcher is configured to obscure certain icons (referred to as "hidden icons") until the user instructs the application launcher to display the icon on a launch screen. The user can instruct the application launcher to display the hidden icon by, for example, performing a specific gesture on the touch screen of the user device (e.g., a crisscross) at a specific location on the touch screen and launch screen (e.g., at a location where the hidden icon would be displayed). In another example, the user may instruct the application launcher to display a hidden icon by performing a long press at a specific location of the touch screen and/or launch screen and stating a passcode (e.g., "open sesame"). In this example, the application launcher determines whether to show a hidden icon, only if the user knows a location of the hidden application and a passcode.

FIGS. 1A-1H illustrate an example of a user device 200 displaying a launch screen 100 via an application launcher (not shown). A launch screen 100 may include any graphical user interface displayed by an application launcher that displays multiple application icons 130. The user can select (e.g., press on) an icon 130 displayed in a launch screen. In response to the selection, the application launcher launches the application. Launching an application may include the application launcher instructing a kernel of the operating system to start a process for the native application. Additionally, in some scenarios, a process for the native application may already have been started. In such scenarios, "launching" the application may include the application launcher instructing the kernel of the operating system to bring the native application to the forefront (i.e., present the current screen of the native application). As mentioned, a launch screen may be a home screen 100H or an application menu launch screen 100M.

Figure 1A:
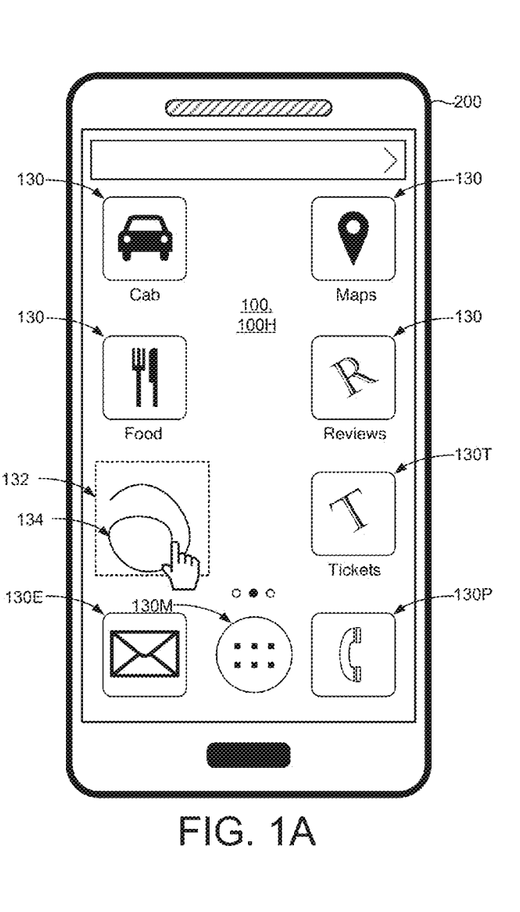
FIG. 1A is a diagram illustrating a home screen of a user device displaying a plurality of icons.

In FIG. 1A, the application launcher is displaying multiple application icons 130 in a launch screen. In the example of FIG. 1A, the launch screen is a home screen 100H of the user device 200. The user device 200 may display multiple home screens 100H, with one of the screens being the default home screen 100H. The default home screen 100H is the initial home screen that the user device presents via the display. The icons 130 displayed in the launch screen 100 may correspond with another applications. For example, a first icon 130E may correspond with an email application, a second icon 130P may correspond with a phone application, and a third icon 130T may correspond with a ticketing application. In the illustrated example, a menu icon 130M may correspond launch an application menu launch screen 100M (FIGS. 1C and 1D). In the illustrated example, the launch screen 100 includes an unpopulated screen location 132. In this example, the user has designated the unpopulated screen location 132 as the location 132 of a hidden icon (not shown in FIG. 1A). The application launcher monitors the user's interaction with the unpopulated screen location 132. In response to receiving a valid instruction (e.g., a gesture or along-press and passcode) corresponding to the unpopulated screen location, the application launcher displays the hidden icon (not shown in FIG. 1A). In the illustrated example, the user has performed a gesture 134 on the touchscreen display 206 to invoke the hidden icon (not shown).

Figure 1B:
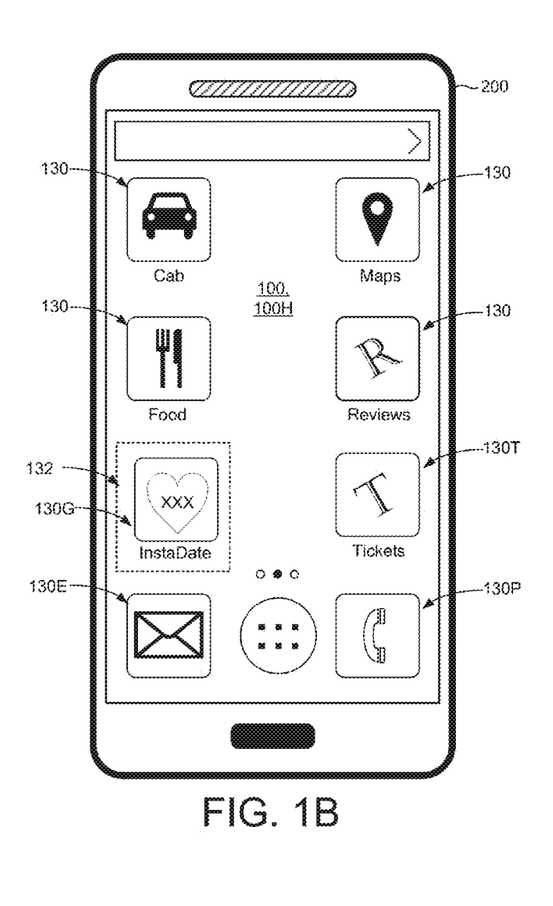
FIG. 1B is a diagram illustrating the home screen of the user device displaying the plurality of icons as well as a hidden icon.
Figure 1C:
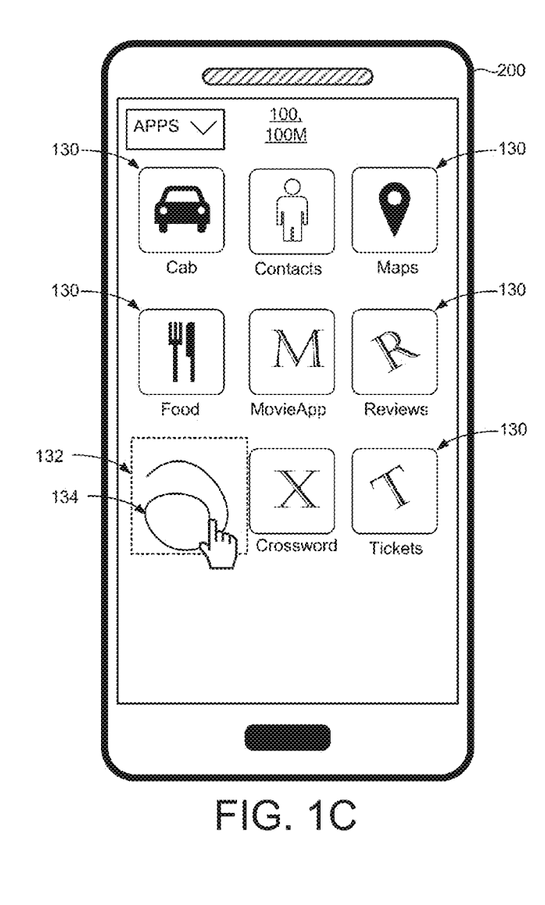
FIG. 1C is a diagram illustrating an application menu launch screen of a user device displaying a plurality of icons.
Figure 1D:
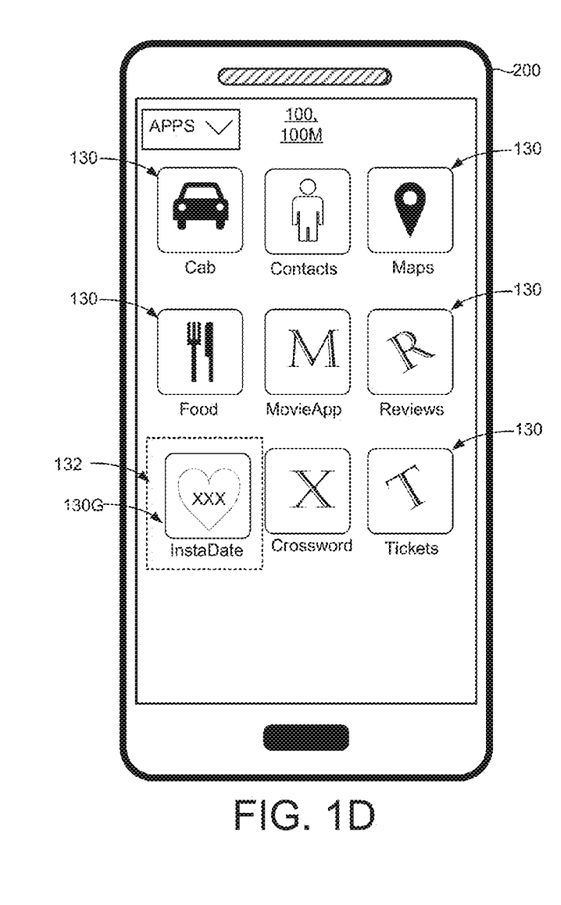
FIG. 1D is a diagram illustrating the application menu launch screen of the user device displaying the plurality of icons as well as a hidden icon.

FIG. 1B illustrates an example of the launch screen 100 of FIG. 1A response to the performance of the gesture 134 by the user. In the illustrated example, the application launcher determines that the user has entered an unlocking instruction (e.g., gesture 134) and in response to the determination, the application launcher displays the hidden icon 130G. In this example, the hidden icon 130G corresponds to a dating application. The user can select (e.g., press on) the hidden icon 130G. In response to the user selecting the hidden icon 130G, the application launcher launches the corresponding native application (e.g., the dating application). While the foregoing example relies on a gesture-based unlocking instruction to reveal the hidden icon 130G, other types of unlocking instructions may be utilized to reveal the hidden icon 130G. It is noted that while the gesture 134 is shown as a pattern, the gesture 134 may be other suitable gestures including a double or triple tap at the unpopulated screen location 132. In some implementations, the instruction is delivered by detecting an action (e.g., a "long-press") and receiving a verified passcode (e.g. typed or spoken). For instance, the user may perform a long-press on the unpopulated screen location 132 (FIG. 1A). In response to the long-press, the application launcher may instruct the operating system to turn on the microphone for a predetermined length of time (e.g., three seconds). If the user utters and the application launcher recognizes a known passcode associated with the hidden icon (e.g., "open sesame"), the application launcher determines that the user wishes to have the hidden icon 130G presented. In other implementations, the instruction may rely on a detected event (e.g., a long press) and finger-print recognition.

FIGS. 1C and 1D illustrate an example of an application menu launch screen 100M. In this example, the application menu launch screen 100M may be presented in response to the user selection of the corresponding icon 130M (FIG. 1A). In FIG. 1C, the application menu launch screen 100M is concealing the hidden icon (not shown). The user can provide an instruction with respect to the unpopulated screen location 132. For instance, the user can enter a gesture 134 at the unpopulated screen location 132. In response to the recognizing the gesture 134 corresponding to the unpopulated screen location 132, the application launcher displays the hidden icon 130G at the unpopulated screen location 132, as shown in FIG. 1D. As previously discussed, the application launcher may implement other types of instructions to reveal the hidden icon.

Figure 1E:
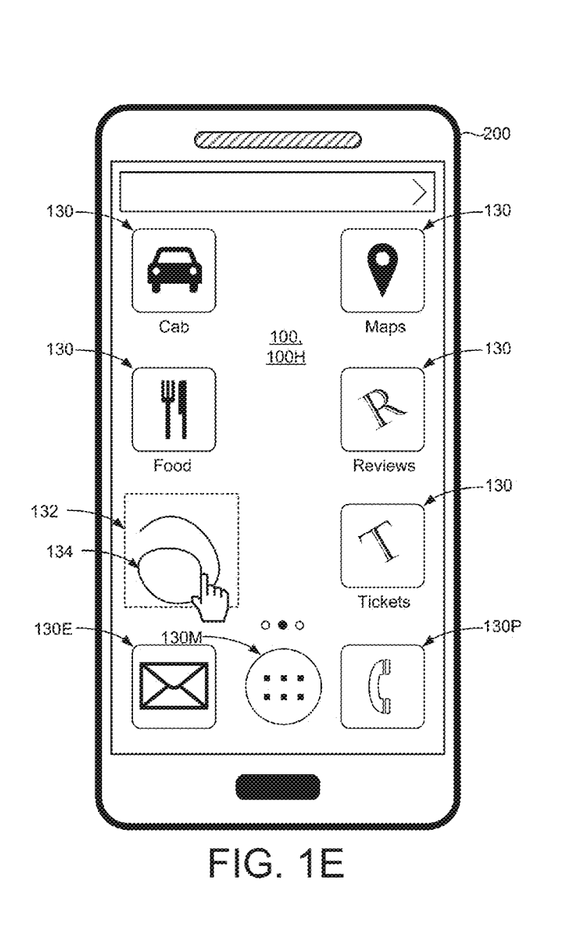
FIG. 1E is a diagram illustrating a home screen of a user device displaying a plurality of icons.
Figure 1F:
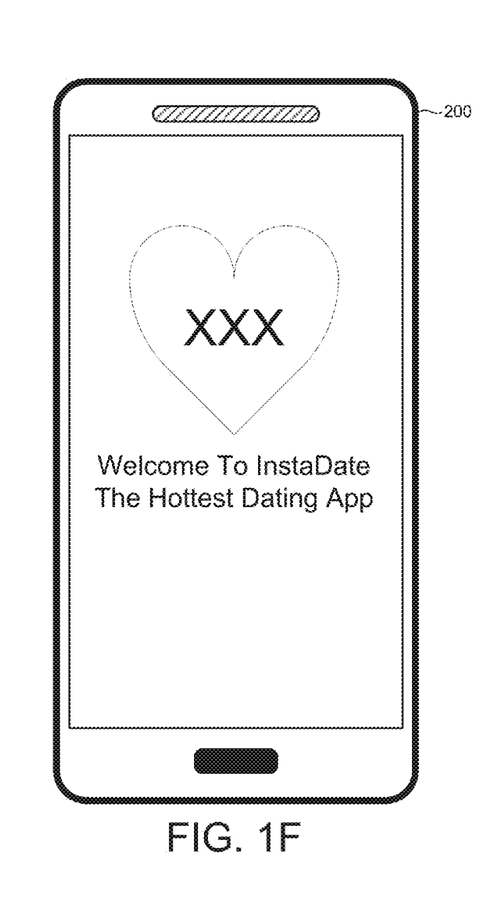
FIG. 1F is a diagram illustrating the user device launching a native application corresponding to a hidden icon in response to a user instruction.

FIGS. 1E and 1F, the application launcher is configured to launch a native application in response to detecting an instruction associated with the unpopulated screen location 132. In the illustrated example, the instruction is a predefined gesture 134. In response to detecting the gesture 134 (FIG. 1E), the application launcher launches the InstaDate native application (FIG. 1F).

Figure 1G:
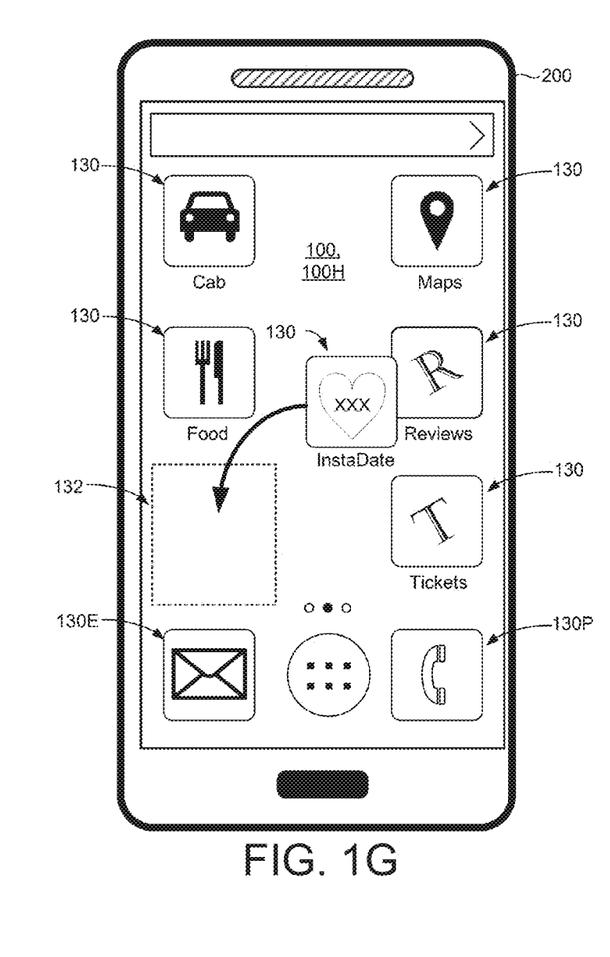
FIGS. 1G and 1H are diagrams illustrating the user device allowing a user to hide an icon from the home screen.
Figure 1H:
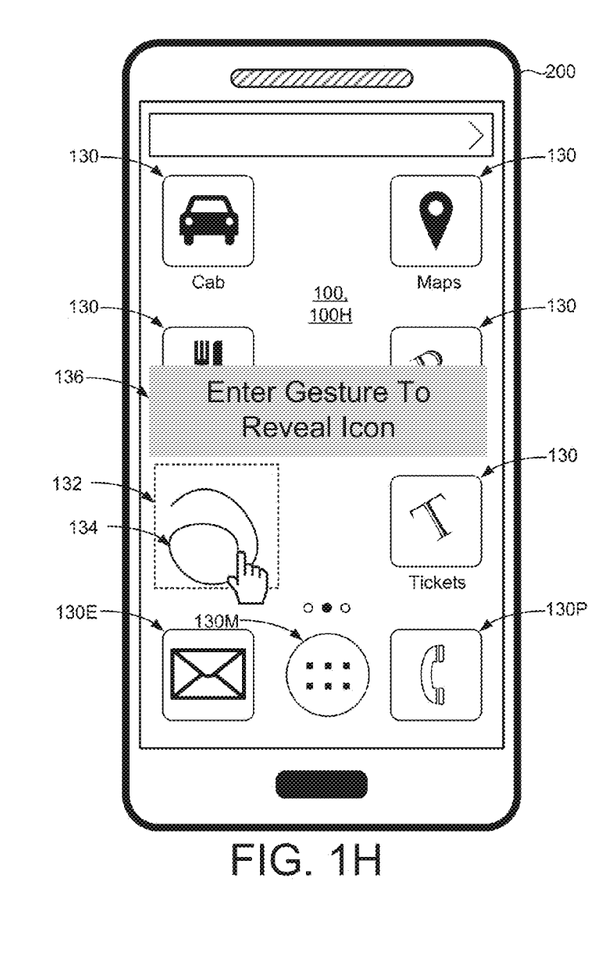

FIGS. 1G and 1H illustrate an example of a user setting an icon to a hidden icon. In FIG. 1G, the user drags the icon 130 to an unpopulated screen location 132. The user may be able to drag the icon 130 from an application menu launch screen (e.g., FIG. 1C). The user can place the icon 130 in the selected unpopulated screen location 132. The user may then be prompted to enter an unlocking instruction (not shown). For example, the user may be prompted to enter a gesture or passcode (e.g., prompt 136) or to speak a passcode. The user device 200 saves the instruction in the memory of the user device 200 and notes the location. Once the user has set the icon to a hidden icon, the application launcher may hide the icon 130G from the launch screen 100.

Figure 2:
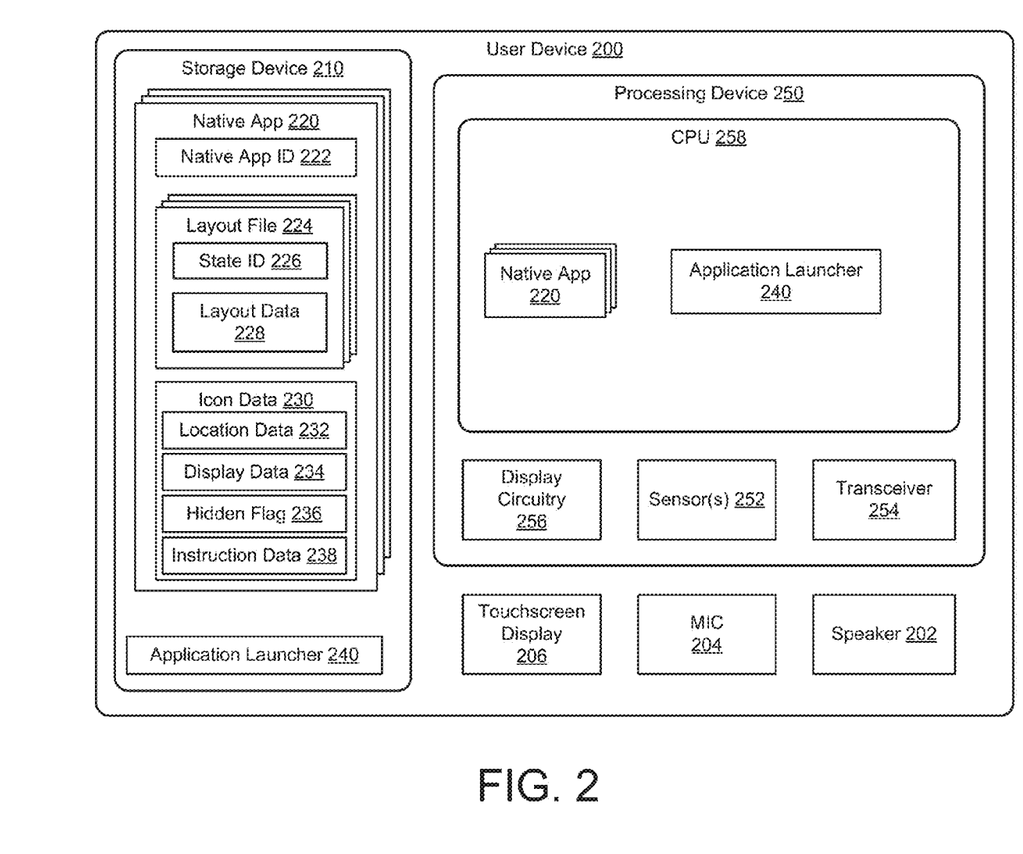
FIG. 2 is a diagram illustrating an example user device configured to hide icons from a launch screen.

FIG. 2 is a schematic illustrating an example of a user device 200 according to some implementations of the present disclosure. The user device 200 may include a speaker 202, a microphone 204, a touchscreen display 206, a storage device 210 and a processing device 250. The user device 200 may include other components not explicitly discussed.

The processing device 250 may include one or more sensors 252, a transceiver 254, display circuitry 256 and one or more CPUs 258. Referring to the sensors 252, example sensors 252 include a location sensor that determines a location of the user device 200. The location sensor may use Global Positioning System (GPS) and/or Global Navigation Satellite System (GLONASS). The sensors 252 may include an accelerometer, a magnetometer, a gyroscope, a thermometer, a fingerprint scanner, etc. The sensors 252 capture sensor measurements. The sensors 252 may capture the sensor measurements periodically and/or in response to a request. The processing device 250 may store the sensor measurements captured by the sensors 252 in the storage device 210. The processing device 250 may retrieve the stored sensor measurements from the storage device 210 and use the retrieved sensor measurements at a later time.

The display circuitry 256 causes the touchscreen display 206 to display information. The display circuitry 256 may receive user input (e.g., user selections) from the touchscreen display 206. The display circuitry 256 may include a display driver. The display driver may drive the touchscreen display 206. For example, the display circuitry 256 may include a Light Emitting Diode (LED) driver that may drive a LED display. The display circuitry 256 may drive a stereoscopic display (e.g., an autostereoscopic 3D display).

The transceiver 254 enables electronic communication with the ad server (not shown). The transceiver 254 may include a cellular transceiver, for example, LTE transceiver, a LTE-Advanced transceiver, or a 5G ($5^{th}$ generation mobile network) transceiver. The transceiver 254 may include a Wireless Fidelity (Wi-Fi) transceiver. The transceiver 254 may include a ZigBee transceiver, a Bluetooth transceiver (e.g., Bluetooth Low Energy transceiver), a Near Field Communications (NFC) transceiver, etc.

The transceiver 254 may enable the user device 200 to communicate with electronic devices that are proximate to the user device 200. An electronic device may be referred to as being in proximity with the user device 200 when the user device 200 can communicated with the electronic device via short-range communications (e.g., Wi-Fi, NFC, Bluetooth, ZigBee, etc.). Alternatively or additionally, an electronic device may be referred to as being in proximity with the user device 200 when a distance between the user device 200 and the electronic device is less than a threshold distance (e.g., about 100 feet). Example electronic devices include appliances (e.g., refrigerator, stove, oven, microwave, coffee maker, toaster, etc.), home automation devices (e.g., thermostat, smoke detector, security system, etc.) and automobiles (e.g., cars, trucks, motorcycles, etc.).

The CPU(s) 258 are capable of executing computer-readable instructions that cause the CPU(s) 258 to execute the native applications 220 and the application launcher 240. The CPU(s) 258 may be based on the reduced instruction set computing (RISC) architecture (e.g., an ARM processor). Alternatively, the CPU(s) 258 may be based on the complex instruction set computing (CISC) architecture (e.g., an x86 processor). The CPU(s) 258 may be based on other architectural models (e.g., quantum computing). The CPU(s) 258 may refer to a single CPU or to multiple CPUs (e.g., dual-core, quad-core or octa-core). The CPU(s) 258 may include general-purpose CPU(s) or special-purpose CPU(s), for example, Application Specific integrated Circuit(s) (ASIC(s)). The CPU(s) 258 may execute the native applications 220 and the application launcher 240. Native applications that are being executed by the CPU(s) 258 may be referred to as active native applications 220 and their application IDs may be referred to as active application IDs 222.

The storage device 210 may include one or more computer-readable storage mediums. The storage device 210 may include flash memory, solid-state memory, hard disk memory, or the like. The storage device 210 may be in communication with the processing device 250 via an electronic communication medium (e.g., a bus).

The storage device 210 stores native applications 220 that are installed on the user device 200. Each native application 220 may include computer-readable instructions and data that cause the native application 220 to perform one or more functions. Each native application 220 may include a native application ID 222 ("application ID" hereinafter) that identifies the native application 220. Each native application 220 may include one or more layout files 224 corresponding to different functions of the application. The layout file 224 may include a state ID 226. The state ID 226 defines the state or states for which the layout file 224 is used. The layout data 228 of the layout file 224 may define the look and feel of the native application when the native application is set to a particular state or set of states corresponding to the state ID 226. The layout data 228 may define where images, text, GUI elements, and other visual data is displayed on the screen. The layout data 228 may further indicate an address (e.g., a web address) where the native application may request data to be presented by the native application. The native application may request the data using the web address and may bind the requested data to the layout file. In this way, the native application can present the requested data. For example, a layout file 224 of a weather application may indicate a web address of a server associated with the weather application. When the user opts to see the weather of a particular location, the weather application may request weather data from the server using the web address and a requested location. The weather application receives the weather data and binds the received weather data to the layout file. The weather application then outputs the layout file with the weather data to the display 206.

Each native application 220 may further include icon data 230. Icon data 230 may include any data relating to the icon 130 of the native application 220. Icon data may include location data 232, display data 234, a hidden flag 236, and instruction data 238. The icon data 230 may include additional data not explicitly discussed.

The location data 232 may define a location at which the icon is displayed on a launch screen 100. The location data may identify a launch screen (e.g., a home screen and/or an application menu launch screen) in which the icon 130 is displayed. The location data 232 may further define a row and column of the launch screen at which the icon 130 is displayed. Thus, in some implementations the location data 232 is defined by a triplet defining the launch screen, the row, and the column. The location data 232 may be defined in other suitable manners. For example, a launch screen may be divided into a grid by way of the rows and columns. Each grid location may be assigned a value, whereby the grid location is referenced by the assigned value.

The display data 234 may include an image of the icon 130 and text that is displayed with respect to the icon (e.g., the name of the application). Put another way, the display data 234 defines the icon 130 that is displayed on a launch screen and any text displayed in relation thereto (e.g., the name of the application).

The hidden flag 236 is a flag indicating whether the icon 130 is to be displayed or hidden. If the flag is set, then the icon 130 is hidden from any launch screens. In this way, the icon 130 is a hidden icon 130G. The hidden flag 236 may be set in response to a user selecting the icon 130 to be hidden from view. The user may select the icon 130 to be hidden from view by, for example, long pressing the icon 130. In response to the long press, the user may be presented with an option to hide the icon. If the user opts to hide the icon, the hidden flag 236 is set.

The instruction data 238 indicates the unlocking instruction that is associated with an icon 130 when the icon 130 is hidden (e.g., when the hidden flag 236 is set). The unlocking instruction may define a gesture, a passcode (text or speech), or biometric data. For example, the instruction may define a gesture associated with the icon. The gesture may be a gesture defined by the user when the user selects the icon to be a hidden icon. Additionally or alternatively, the instruction may define a passcode. The passcode can be a string of letters, number, and/or symbols or may be a spoken phrase. Additionally or alternatively, the passcode may define biometric data. For example, the biometric data may include fingerprint information and/or a photo of the user's face. When the user wishes to utilize a hidden icon 130G, the application launcher 240 prompts the user to enter an instruction and the user subsequently enters an unlocking instruction, the application launcher 240 can verify the entered unlocking instruction with the instruction data 238.

The storage device 210 may also store the application launcher 240. The application launcher 240 is a set of computer-readable instructions that are executed by the processing device 250. The application launcher 240 may be part of the operating system of the user device 200. Alternatively, the user may download a third-party application launcher 240 to the user device. The application launcher 240 displays launch screens and launches the native applications 220. The application launcher 240 launches a native application 220 in response to the user device 200 receiving a user selection to launch the native application 220 (e.g., upon receiving a user selection of an icon 130 corresponding with the native application 220). To launch a native application 220, the application launcher 240 may instruct a kernel of the operating system to start a process for the native application 220. To start the process, the kernel may allocate memory for bookkeeping and then load (e.g., retrieve) the computer-readable instructions corresponding with the native application 220 to the CPU 258.

The application launcher 240 monitors the touchscreen display 206 to determine whether a user has selected an icon 130 or has performed another action with respect to the touchscreen display 206. The application launcher 240 may perform one or more processes to monitor the touchscreen display 206. Included in these processes, the application launcher 240 may perform a process to monitor the touch screen to determine whether to display a hidden icon 130G in a launch screen (or to launch the native application associated with the hidden icon 130G). In some implementations, the application launcher 240 segments the launch screen displayed on the touchscreen display 206 into a grid defined by rows and columns. Each grid location (e.g., square in the grid may represent a different row and column combination. When the application launcher 240 detects an interaction with a particular grid location of the grid, the application launcher 240 may perform an action with respect to the icon 130 displayed (or not displayed) at the particular grid location. For example, if the application launcher 240 detects a tap at a grid location displaying a particular icon 130, the application launcher 240 may launch the native application 220 corresponding to the particular icon 130. If the application detects 240 a long press on the grid location displaying the particular icon 130, the application launcher may display a menu of options (e.g., "remove icon 130," "hide icon," or "uninstall application"). In the event the user opts to hide an icon, the application launcher 240 may display a prompt to select a location of the hidden icon 130G (e.g., drag and drop to the location). The application launcher may then prompt the user to register an unlocking instruction. For example, the application launcher 240 may prompt the user to enter a gesture or passcode or to utter a passcode. In response to the user issuing the unlocking instruction, the application launcher 240 can update the icon data 230 of the native application 220 corresponding to the selected icon 130 with the instruction entered by the user.

The application launcher further monitors the launch screen 100 displayed by the touchscreen display 206 to determine if the user is attempting to invoke a hidden icon 130G. In the event an initial action (e.g., long press or double tap) is detected at an unpopulated screen location 132 associated with a hidden icon 130G, the application launcher 240 can determine whether the user provides a verified instruction. The application launcher 240 can compare an instruction (e.g., gesture) entered by the user with the instruction data 238 defined in the icon data 230 of the native application 220 corresponding to the unpopulated screen location 132 selected by the user. If the instruction matches the instruction data 238, the application launcher can display the hidden icon 130G and/or launch the native application corresponding to the hidden icon 130G.

Figure 3:
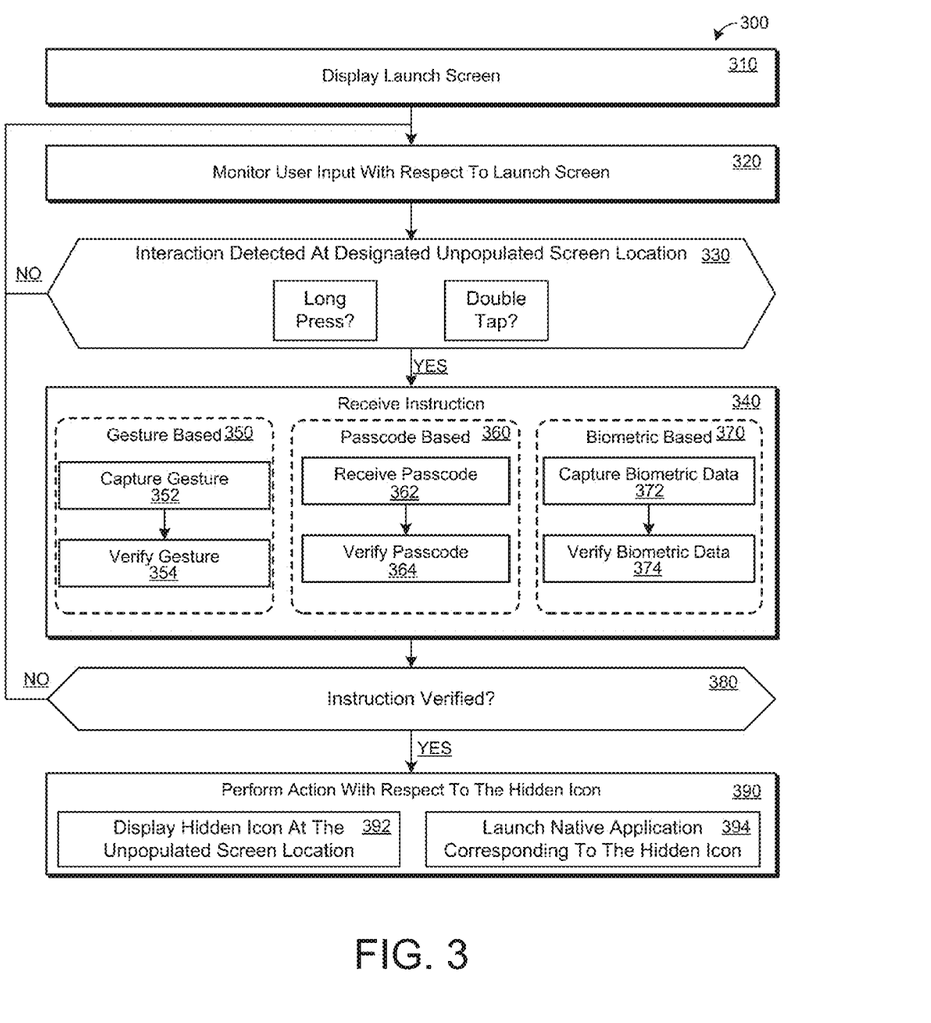
FIG. 3 is a flow chart illustrating a set of operations of a method for performing an action with respect to a hidden icon.

FIG. 3 is a flow chart illustrating a set of operations of a method 300 for performing an action with respect to a hidden icon 130G. The method 300 is described with respect to an application launcher 240.

At 310, the application launcher 240 displays a launch screen 100. As previously discussed the launch screen 100 may be a home screen 100H of the user device 200 or an application menu launch screen 100M. The application launcher 240 may allow a user to toggle between launch screens by, for example, swiping left or right or by selecting an application menu icon 130M. Each launch screen may be divided into a grid.

At 320, the application launcher 240 monitors the user input with respect to the launch screen. Monitoring the user input with respect to the launch screen can include detecting an interaction with the touchscreen display 206. When an interaction is detected at the touchscreen display 206, the application launcher 240 determines a location of the touchscreen that received input. The application launcher 240 can also determine the type of interaction. For example, the application launcher 240 may determine that the user has performed a single tap, a tong press, a double tap, or a swipe.

At 330, the application launcher 240 determines whether a designated interaction is detected at a designated unpopulated screen location. The application launcher 240 may maintain a list of grid locations that are designated unpopulated screen locations. Put another way, the application launcher 240 may keep track of which grid locations correspond to hidden icons 130G. In the event the application launcher 240 detects a designated interaction (e.g., a touch, a long press, or double tap) at a designated unpopulated screen location, the application launcher awaits an instruction from the user.

At 340, the application launcher 240 receives an instruction from the user. The instruction may be gesture based 350, passcode-based 360, or biometric based 370.

Receiving a gesture-based instruction (350) may include capturing a gesture performed by the user at the unpopulated screen location at 352. The application launcher 240 records the gesture. At 354, the application launcher 240 verifies the gesture by comparing the gesture performed by the user with the gesture stored in the instruction data 238 corresponding to the unpopulated screen location. The application launcher can retrieve the icon data 230 that identifies the unpopulated screen location (e.g., the launch screen and grid location) in its location data 232. The application launcher 240 can then compare the instruction data 238 with the entered gesture. If the gesture matches the instruction data 238, then the application launcher verifies the gesture.

Receiving a passcode-based instruction (360) may include receiving a passcode from the user at 362. The application launcher 240 may accept text and/or speech input. In the latter scenario, the application launcher 240 may turn on the microphone of the user device 200 to receive the speech input. In the former scenario, the application launcher 240 may display a prompt to enter a passcode and may display a keyboard. The user can enter the passcode (e.g., type the passcode or speak the passcode). At 364, the application launcher 240 verifies the passcode by comparing the gesture performed by the user with the passcode stored in the instruction data 238 corresponding to the unpopulated screen location. The application launcher can retrieve the icon data 230 that identifies the unpopulated screen location (e.g., the launch screen and grid location) in its location data 232. The application launcher 240 can then compare the instruction data 238 with the entered passcode. If the passcode matches the instruction data 238, then the application launcher verifies the passcode.

Receiving a biometric-based instruction (370) may include receiving biometric data of a user at 372. The application launcher 240 may receive, for example, a fingerprint scan of the user or a captured image of the user. In the former scenario, the application launcher 240 may prompt the user to put a finger on fingerprint scanner of the user device. The application launcher 240 then receives the biometric data in the form of a fingerprint scan from the fingerprint scanner. In the latter scenario, the application launcher 240 can instruct a forward-facing camera of the user device to capture an image of the user. In this scenario, the biometric data is the captured image from the forward-facing camera. At 374, the application launcher 240 verifies the biometric data. The application launcher can utilize fingerprint matching or facial recognition techniques to verify the biometric data. The application launcher 240 can compare the biometric data provided by the user with the biometric data associated with the unpopulated screen location. In some implementations, the application launcher can retrieve the icon data 230 that identifies the unpopulated screen location (e.g., the launch screen and grid location) in its location data 232. The application launcher 240 can then compare the instruction data 238 with the entered biometric data. If the biometric data matches the instruction data 238, then the application launcher 240 verifies the biometric data.

At 380, the application launcher 240 determines whether the instruction is verified. If the instruction is not verified, the application launcher 240 disregards the user input and continues to monitor the launch screen 100. If the instruction is verified, the application launcher 240 performs an action with respect to the hidden icon 130, as shown at 390. Performing an action with respect to the hidden icon 130G may include displaying (392) the hidden icon 130G and/or launching (394) the native application 220 associated with the hidden icon 130G.

The method 300 of FIG. 3 may be a standalone method or may be included in other processes performed by the application launcher. The method 300 may include additional or alternative operations.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., un HTML page) to a client device (e.g., for purposes of displaying data to and receiving user input from a user interacting with the client device). Data generated at the client device e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A user device comprising:
  a touchscreen;
  a storage device storing a set of native applications and icon data corresponding to each respective one of the native applications, wherein the icon data of each of the native applications:
  defines a respective icon,
  includes a location for the respective icon on a launch screen,
  includes a hidden flag indicating whether the respective icon is visible or hidden, and
  includes, when the hidden flag of the respective icon indicates that the respective icon is hidden, an unlocking instruction associated with the respective icon; and
  a processing device that executes computer-readable instructions that, when executed by the processing device, cause the processing device to:
  display the launch screen via the touchscreen, wherein the launch screen displays at least some of the icons at corresponding locations of the launch screen,
  monitor the touchscreen for a user input,
  receive the user input at an unpopulated screen location of the launch screen, wherein the unpopulated screen location is designated for one of the icons and not for the other ones of the icons, and wherein the one of the icons is hidden such that the one of the icons is not displayed prior to and when the user input is received,
  receive a user instruction corresponding to the unpopulated screen location,
  verify the user instruction with the unlocking instruction associated with the one of the icons, and
  in response to the user instruction being verified, change a status of the hidden flag of the one of the icons and display the one of the icons at the unpopulated screen location designated for the one of the icons,
  wherein the instructions when executed cause the processing device to:
  monitor the touchscreen for a second user input;
  receive the second user input at a second unpopulated screen location of the launch screen, wherein the one of the icons is a first icon, wherein the second unpopulated screen location is designated for a second one of the icons and not for the first icon, and wherein the second one of the icons is hidden such that the second one of the icons is not displayed prior to and when the second user input is received;

receive a second user instruction corresponding to the second unpopulated screen location, wherein the second user instruction is different than the user instruction;

verify the second user instruction with the unlocking instruction associated with the second one of the icons; and in response to the second user instruction being verified, change a status of the hidden flag of the second one of the icons and display the second one of the icons at the unpopulated screen location designated for the second one of the icons.

2. The user device of claim 1, wherein:
the user instruction is a gesture performed on the touchscreen at the unpopulated screen location, and
the unlocking instruction associated with the one of the icons is a previously registered gesture.

3. The user device of claim 2, wherein:
the receiving of the user instruction includes:
in response to the received user input at the unpopulated screen location, monitoring the unpopulated screen location for additional user input,
receiving the gesture performed on the touchscreen at the unpopulated screen location via the touchscreen, and
recording the gesture performed on the touchscreen; and
the verifying of the user instruction includes:
retrieving the icon data corresponding to the one of the icons based on the unpopulated screen location,
comparing the recorded gesture with the registered gesture, and
verifying the user instruction when the recorded gesture matches the registered gesture.

4. The user device of claim 1, wherein:
the user instruction is a passcode entered by the user; and
the unlocking instruction associated with the one of the icons is a previously registered passcode.

5. The user device of claim 4, wherein:
the receiving of the user instruction includes:
in response to the received user input at the unpopulated screen location, turning on a microphone of the user device,
receiving the passcode from the user in a form of audio input via the microphone, and
recording the audio input; and
the verifying of the user instruction includes:
retrieving the icon data corresponding to the one of the icons based on the unpopulated screen location,
comparing the recorded audio input with the registered passcode, and
verifying the user instruction when the recorded audio input matches the registered passcode.

6. The user device of claim 4, wherein:
the receiving of the user instruction includes:
in response to the received user input at the unpopulated screen location, prompting the user to enter the passcode via the touchscreen,
receiving the passcode from the user via the touchscreen, and
recording the received passcode; and
the verifying of the user instruction includes:
retrieving the icon data corresponding to the one of the icons based on the unpopulated screen location,
comparing the received passcode with the registered passcode, and
verifying the user instruction when the received passcode matches the registered passcode.

7. The user device of claim 1, wherein:
the user instruction includes biometric data provided by the user; and
the unlocking instruction associated with the one of the icons includes previously registered biometric data.

8. The user device of claim 1, wherein the hidden flag corresponding to the native application of the one of the icons is set by:
displaying the one of the icons at a specific grid location in the launch screen corresponding to the unpopulated screen location;
detecting a recognized action at the specific grid location;
prompting the user to register an instruction with respect to the one of the icons;
receiving the registered instruction via the touchscreen;
associating the registered instruction with the native application of the one of the icons; and
setting the hidden flag of the native application of the one of the icons.

9. The user device of claim 1, wherein:
the unpopulated screen has adjacent locations designated for other ones of the icons; and
at least one of:
the other ones of the icons in the adjacent locations are displayed while the one of the icons is hidden; or
statuses of the hidden flags of the other ones of the icons in the adjacent locations remain unchanged when the user instruction is verified.

10. The user device of claim 1, wherein the previously registered gesture is a predetermined swipe pattern entered by a swipe of a single finger in the unpopulated screen location.

11. A user device comprising:
a touchscreen;
a storage device storing a set of native applications and icon data corresponding to each respective one of the native applications, wherein the icon data of each of the native applications:
defines a respective icon,
includes a location for the respective icon on a launch screen,
includes a hidden flag indicating whether the respective icon is visible or hidden, and
includes, when the hidden flag indicates the respective icon is hidden, an unlocking instruction associated with the respective icon; and
a processing device that executes computer-readable instructions that, when executed by the processing device, cause the processing device to:
display the launch screen via the touchscreen, wherein the launch screen displays at least some of the icons at corresponding locations of the launch screen,
monitor the touchscreen for a user input,
receive the user input at an unpopulated screen location of the launch screen, wherein the unpopulated screen location is designated for one of the icons and not for the other ones of the icons, and wherein the one of the icons is hidden such that the one of the icons is not displayed prior to and when the user input is received,
receive a user instruction corresponding to the unpopulated screen location,
verify the user instruction with the unlocking instruction associated with the one of the icons, and
in response to the user instruction being verified and independent of whether the one of the icons is displayed, launch the native application corresponding to the one of the icons, wherein the instructions when executed cause the processing device to:
monitor the touchscreen for a second user input;
receive the second user input at a second unpopulated screen location of the launch screen, wherein the one of the icons is a first icon, wherein the second unpopulated screen location is designated for a second one of the icons and not for the first icon, and wherein the second one of the icons is hidden such that the second one of the icons is not displayed prior to and when the second user input is received;
receive a second user instruction corresponding to the second unpopulated screen location, wherein the second user instruction is different than the user instruction;
verify the second user instruction with the unlocking instruction associated with the second one of the icons; and
in response to the second user instruction being verified, change a status of the hidden flag of the second one of the icons and display the second one of the icons at the unpopulated screen location designated for the second one of the icons.

12. The user device of claim 11, wherein:
the user instruction is a gesture performed on the touchscreen at the unpopulated screen location; and
the unlocking instruction associated with the one of the icons is a previously registered gesture.

13. The user device of claim 12, wherein the receiving of the user instruction includes:
in response to the received user input at the unpopulated screen location, monitoring the unpopulated screen location for additional user input;
receiving the gesture performed on the touchscreen at the unpopulated screen location via the touchscreen; and
recording the gesture performed on the touchscreen.

14. The user device of claim 13, wherein the verifying of the user instruction includes:
retrieving the icon data corresponding to the one of the icons based on the unpopulated screen location;
comparing the recorded gesture with the registered gesture; and
verifying the user instruction when the recorded gesture matches the registered gesture.

15. The user device of claim 11, wherein:
the user instruction is a passcode entered by the user; and
the unlocking instruction associated with the one of the icons is a previously registered passcode.

16. The user device of claim 15, wherein the receiving of the user instruction includes:
in response to the received user input at the unpopulated screen location, turning on a microphone of the user device,
receiving the passcode from the user in a form of audio input via the microphone, and
recording the audio input; and
the verifying of the user instruction includes:
retrieving the icon data corresponding to the one of the icons based on the unpopulated screen location,
comparing the recorded audio input with the registered passcode, and
verifying the user instruction when the recorded audio input matches the registered passcode.

17. The user device of claim 15, wherein:
the receiving of the user instruction includes:
in response to the received user input at the unpopulated screen location, prompting the user to enter the passcode via the touchscreen,
receiving the passcode from the user via the touchscreen, and
recording the received passcode; and
the verifying of the user instruction includes:
retrieving the icon data corresponding to the one of the icons based on the unpopulated screen location,
comparing the received passcode with the registered passcode, and
verifying the user instruction when the received passcode matches the registered passcode.

18. The user device of claim 11, wherein:
the user instruction includes biometric data provided by the user; and
the unlocking instruction associated with the one of the icons includes previously registered biometric data.

19. The user device of claim 11, wherein the hidden flag corresponding to the native application of the one of the icons is set by:
displaying the one of the icons at a specific grid location in the launch screen corresponding to the unpopulated screen location;
detecting a recognized action at the specific grid location;
prompting the user to register an instruction with respect to the one of the icons;
receiving the registered instruction via the touchscreen;
associating the registered instruction with the native application of the one of the icons; and
setting the hidden flag of the native application of the one of the icons.

* * * * *